United States Patent [19]

Schwartz

[11] 4,010,326

[45] Mar. 1, 1977

[54] LINE SELECTIVE TIME DIVISION COMMUNICATION SYSTEM

[75] Inventor: Norman L. Schwartz, Stony Brook, N.Y.

[73] Assignee: Multiplex Communications, Inc., Hauppage, N.Y.

[22] Filed: May 29, 1975

[21] Appl. No.: 581,972

Related U.S. Application Data

[63] Continuation-in-part of Ser. No. 414,434, Nov. 9, 1973, Pat. No. 3,916,108, and a continuation-in-part of Ser. No. 555,562, March 5, 1975.

[52] U.S. Cl. .................... 179/15 BA; 179/15 A; 179/15 AL
[51] Int. Cl.² ..................................... H04J 5/00
[58] Field of Search ..... 179/15 BA, 15 AQ, 15 AL, 179/15 A, 15 BS

[56] References Cited

UNITED STATES PATENTS

| 3,544,976 | 12/1970 | Collins | 179/15 AL X |
| 3,643,030 | 2/1972 | Sparrendahl | 179/15 BA |
| 3,715,505 | 2/1973 | Gordon | 179/15 AQ |
| 3,916,108 | 10/1975 | Schwartz | 179/15 AL X |

OTHER PUBLICATIONS

IEEE Spectrum; Aug. 1967; "Multiple–Access Discrete–Address Communication Systems" by A. M. McCalmont; pp. 87–94.

Primary Examiner—David L. Stewart
Attorney, Agent, or Firm—Hopgood, Calimafde, Kalil, Blaustein & Lieberman

[57] ABSTRACT

The recurring time slots in each line of a time division multiplex communication system are identified by a unique combination of phase relationships among a plurality of synchronization signals. Each of a plurality of terminators sends and receives samples of input and output data to and from an information path consisting of a bundle of discrete lines or buses. Any particular connection involves only on a selected line or lines and is gated to appropriate terminators only during recurring preselected time slots and only via a selected line or lines. Time slots are identified by a unique combination of phase relationships occuring in a separate synchronization path.

5 Claims, 2 Drawing Figures

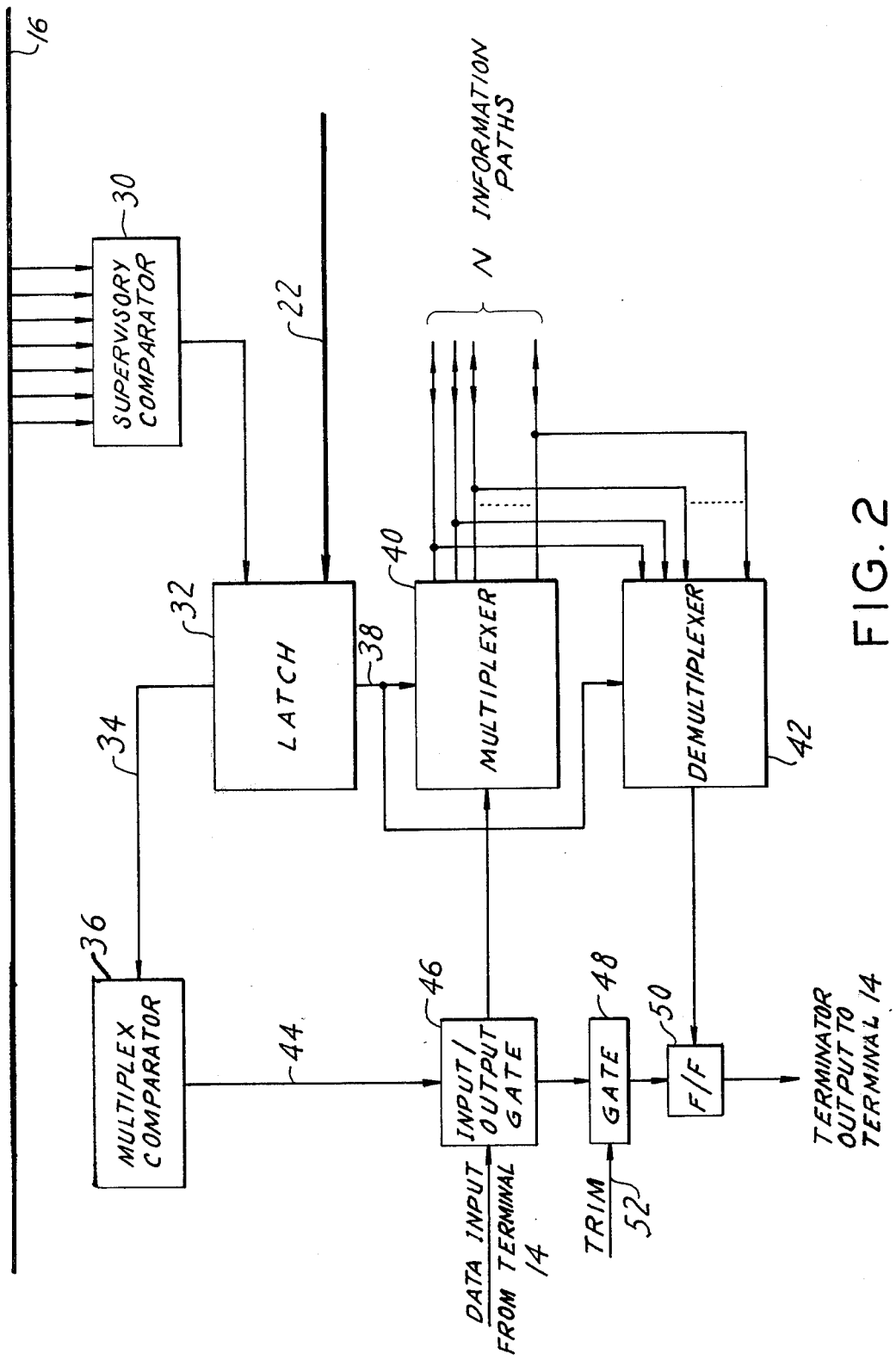

LINE SELECTIVE TIME DIVISION COMMUNICATION SYSTEM

RELATED APPLICATION

The present application is a continuation-in-part of the inventor's earlier application Ser. No. 414,434, filed Nov. 9, 1973, entitled Communication System, and now U.S. Pat. No. 3,916,108 issued Oct. 28, 1975; and is also a continuation-in-part of application Ser. No. 555,562, filed on Mar. 5, 1975 entitled High Speed Multiplex Communication System.

BACKGROUND OF THE INVENTION

The present invention relates to a time-division multiplex communication system, and more particularly a new and improved communication system in which recurring time slots are uniquely identified by simultaneously occurring synchronization signals and information is carried by a path consisting of a bundle of discrete time division lines.

Electronic communication systems were at one time based exclusively on space-division techniques. That is, electromagnetic switches were used to establish connections along discrete paths, each path being dedicated solely to a particular connection throughout its duration. This required large numbers of interconnecting lines in relation to the total number of system inputs and outputs. Moreover, bulky, slow and expensive servo-mechanisms were relied on to establish the desired connections.

With the advent of more sophisticated solid state switching devices and the availability of integrated circuit modules has come the use of time division for information transmission. This sampling technique enables a large number of users to communicate over a single line or bus while only selected interconnections among these users are established. The composite signal passing over the time-division line is divided into a series of frames. Each frame is divided into a series of time slots, and each time slot occurs once per frame.

All communicating locations must be synchronized to a common time base so that the desired recurring time slots can be reliably identified. Synchronization is most commonly accomplished by a periodically occurring sync signal superimposed on the information carried by the time-division path, the sync pulses being identifiable by a predetermined characteristic such as amplitude superiority. Conventional synchronization techniques often require an oscillator or counter at each user location with periodic correction in response to the sync signals so that errors are not cumulative. A part of the signal-carrying capacity of the system must therefore be dedicated to the sync pulses, thus diminishing useful information capacity.

SUMMARY OF THE INVENTION

The present invention fills a long-felt need for a comparatively simple and highly reliable time-division communication system. It utilizes an information path consisting of a bundle of discrete lines for carrying recurring time-division samples of the information to be communicated and a separate synchronization path that carries synchronization signals that are used to synchronize input/output devices by which various types of user apparatus, such as computer terminals, may be connected to the system. Successive samples of an individual signal are supplied to one or more discrete lines of the information path.

An oscillator means is provided to generate a continuous recurring series of synchronization pulses which are supplied via the synchronization path to uniquely identify successive time slots. According to a preferred arrangement, the oscillator means generates a plurality of signals at different frequencies, and a unique combination of phase relationships among these signals identifies each recurring time slot.

Data input and output to the information path is provided by a plurality of terminator means. Each terminator includes a latch means that receives a signal from a supervision path at a preselected time determined by the synchronization path signal. The latch means produces first and second outputs. The first latch output is used to set a multiplexer comparator means which receives the signals carried by the synchronization path and produces a comparator output in response to a preselected recurring synchronization signal. The comparator output is used to time the action of a multiplexer and a demultiplexer which are latched onto an appropriate line or lines by the second output of the latch means.

BRIEF DESCRIPTION OF THE DRAWINGS

For a more detailed understanding of the invention, reference may be made to the description below taken in conjunction with the accompanying drawings wherein:

FIG. 2 is a schematic drawing of a terminator 12 used in the system of FIG. 1.

DESCRIPTION OF THE PREFERRED EMBODIMENT

Figure 1:
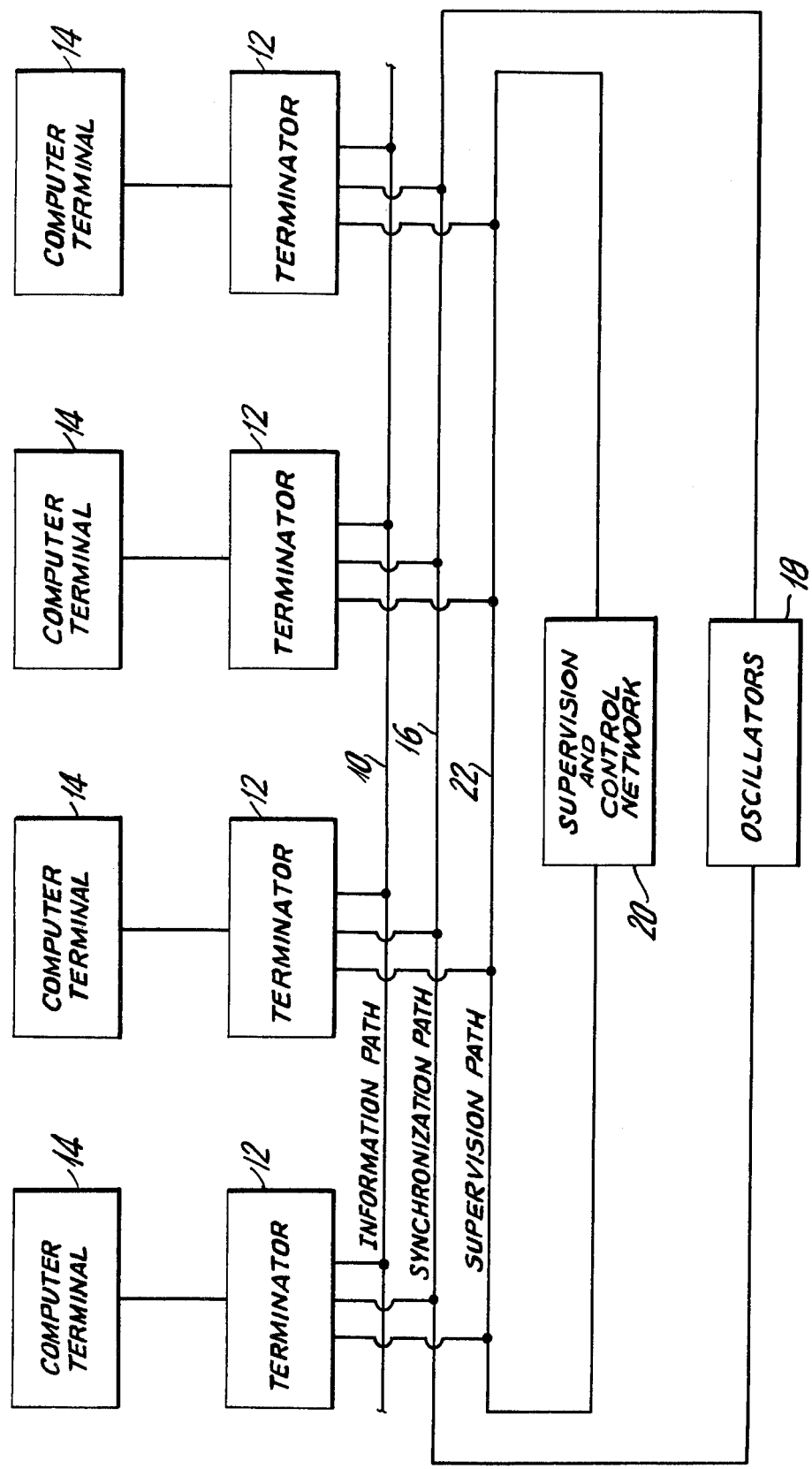
FIG. 1 is a diagram of a time division communication system constructed in accordance with the invention.

In the communication system of this invention, the information to be communicated is time division multiplexed onto an information path 10 which consists of a bundle of discrete lines. Input and output of this multiplexed information is facilitated by a plurality of terminators 12 (four representative terminators being shown in FIG. 1). Each terminator 12 selects the samples pertaining to the connection or connections in which it is taking part by identifying the appropriate line or lines and the appropriate recurring time slots and supplies that information to conventional electronic equipment such as a computer terminal 14. The information may be digital or analog and may have any type of content desired. The terminators 12 are also connected to a synchronization path 16 which carries the output of an oscillator means 18. The output of this oscillator means 18 corresponding in time to any given recurring time slot uniquely identifies that time slot. The oscillator means 18 may comprise a plurality of separate oscillators or a single oscillator connected to conventional frequency dividers or multipliers.

In the preferred embodiment of the invention, the synchronization path 16 comprises a plurality of discrete lines, each of which carries a signal of a different frequency produced by the oscillator means 18. The lowest frequency has a period equal to the length of a complete frame of time slots. The next higher frequency is twice the lowest frequency and each successive higher frequency is twice the one before it. The highest frequency has a period equal to half the duration of an individual time slot. Thus each frequency is an integral multiple of the lowest frequency and all synchronization signals are in phase when the lowest frequency commences a new cycle. Each recurring time slot is identified by a unique combination of phase relationships among the signals produced by the oscillator means 18.

At a centralized location, a supervision and control network 20 sets up and tears down connections between the various terminators 12 over commonly assigned time slots. The necessary information is transmitted over a supervision path 22.

One of the terminators 12 of FIG. 1 is shown in greater detail in FIG. 2. It includes a supervisory comparator 30 which receives a signal from the synchronization path 16.

During a time slot perminently assigned to the particular terminator 12 involved, as indicated by the occurrance of a unique combination of phase relationships in the synchronization 16. Although supervision signals are constantly presented to the supervisory comparator 30, those intended for other terminators 12 are rejected because they do not correspond timewise to the unique phase combination. The accepted supervision signals, however, result in an output from the supervisory comparator 30 to a latch means 32.

When thus activated by the supervisory comparator 30, the latch 32 responds to an input from a bundle of discrete lines that form the supervision path 22 to produce a first output on a line 34 to a multiplex comparator 36 and a second output on a line 38 to a multiplexer 40 and a demultiplexer 42.

In a preferred embodiment, the supervision path 22 includes eight discrete lines. The binary output of three of these lines forms the first latch output, while the binary output of the remaining five lines forms the second latch output. The first latch output sets the multiplex comparator 36 to be responsive to a selected frequency combination of the synchronization path 16, thus indicating the presence of a particular recurring time slot temporarily assigned to the terminator 12 in question. It should be noted that while the supervisory comparator 30 is hardwired or externally set to be responsive to a particular synchronization path phase relationship independently of the signals supplied by the supervision path 22, the multiplex comparator 36 is temporarily set to a time slot selected only for purposes of a particular interconnection.

The second latch output, supplied via the line 38 to the multiplexer 40 and demultiplexer 42, identifies a particular discrete line of the information path 10 to which the multiplexer 40 and demultiplexer 42 are to be temporarily latched. In a preferred embodiment, five binary signals identify one of 32 discrete lines to be used in a particular connection. It is possible, in an alternative arrangement, for the multiplexer 40 and the demultiplexer 42 to be simultaneously latched to a number of selected information path lines. Samples pertaining to a particular connection can then be distributed successively over the various selected lines.

Each time the multiplex comparator 36 produces an output, input data from the terminal 14 can be forwarded, during the then occurring time slot, through an input/output gate 46 to the multiplexer 40 and thus to the selected discrete line of the information path 10. Alternatively, in the receive mode, the input/output gate 46 supplies a signal to a trim gate 48 which in turn enables a flip-flop 50 to receive the output of the demultiplexer 42 which is supplied to the terminal 14. The trim gate 48 is responsive, in the conventional manner, to a trim signal supplied by a line 52 to eliminate cross talk between adjacent time slots. The flip-flop 50 indicates by its high or low state the binary character of information received. Of course, the flip-flop 50 would not be used with analog information.

It can be seen that according to the above arrangement the multiplexer 40 and the demultiplexer 42 select from the appropriate line or lines of the information path 10 only that information presented during a particular recurring time slot. Both the time slot and the information path line or lines involved can be changed at will by the supervision path signals. Accordingly, the system embodies the principal advantages of both time division and space division switching. The usage of each line is maximised since only samples of a signal, not an entire signal, are transmitted, and each line can thus take part in many connections simultaneously. The use of a plurality of discrete lines increase the capacity of the system beyond that which could be attained within acceptable frequency limits if all samples were carried by a single line.

The above-described embodiment of the invention is intended to be merely exemplary and does not limit the scope of the inventive concept. Numerous additional variations and modifications within the spirit and scope of the invention will occur to those skilled in the art.

I claim:

1. A time-division multiplex communication system comprising:

an information path consisting of a plurality of discrete lines each carrying samples of signals transmitted within selected time slots recurring once per frame;

oscillator means for generating a recurring series of synchronization signals that identify occurring time slots by unique combinations of phase relationships;

a synchronization path for carrying synchronization signals generated by the oscillator means;

a supervision path for carrying supervisory signals which indicate interconnections to be made within the system; and a plurality of terminator means for providing data inputs to the information path and receiving data outputs from the information path, each terminator means including a supervisory comparator means for producing an output in response to a unique combination of phase relationship occurring in the synchronization path, latch means for accepting a signal from the supervisory path in response to an output received from the supervisory comparator means and for producing first and second latch outputs in response thereto, multiplexer comparator means for receiving the first latch output whereby said comparator is temporarily set to be responsive to a unique combination of phase relationships in the synchronization path, said multiplexer comparator also being connected to the synchronization path for producing an output in response to the occurrance of said unique combination, demultiplexer means for activating one or more selected information path lines in response to the second latch output and for summing successive input samples sequentially received from the activated line or lines, and multiplexer means also responsive to the second latch output for activating one or more selected information path lines in response thereto and for sequentially supplying successive output samples to the activated line or lines.

2. The communication system of claim 1, wherein the demultiplexer means and the multiplexer means each select only one information path line at a time in response to the first latch means.

3. The communication system of claim 1, wherein the oscillator means produces a plurality of signals of different frequencies, the lowest frequency being at least equal to the frequency with which each time slot recur.

4. The communication system of claim 3, wherein the highest frequency produced by said oscillator means is at least equal to the frequency with which each time slot recurs in a discrete line of the information path multiplied by the number of recurring time slots in a frame.

5. The communication system of claim 1, wherein the oscillator means produces a plurality of signals of different frequencies, the lowest frequency being at least equal to the frequency with which each time slot recurs, and the synchronization path including at least one discrete line dedicated to each frequency produced by the oscillator means.

* * * * *